United States Patent
Connaughton (10) Patent No.: US 7,661,062 B1
(45) Date of Patent: Feb. 9, 2010

(54) SYSTEM AND METHOD OF ANALYZING AN HTML DOCUMENT FOR CHANGES SUCH THAT THE CHANGED AREAS CAN BE DISPLAYED WITH THE ORIGINAL FORMATTING INTACT

(75) Inventor: Chris Connaughton, West Chester, OH (US)

(73) Assignee: Business Objects Americas, San Jose, CA (US)

( * ) Notice: Subject to any disclaimer, the term of this patent is extended or adjusted under 35 U.S.C. 154(b) by 476 days.

(21) Appl. No.: 09/665,888

(22) Filed: Sep. 20, 2000

Related U.S. Application Data (60) Provisional application No. 60/154,966, filed on Sep. 20, 1999.

(51) Int. Cl.
*G06F 17/21* (2006.01)
(52) U.S. Cl. .................... 715/234; 715/229; 715/273
(58) Field of Classification Search ................ 707/102, 707/101, 103, 513, 501, 6, 200–204; 715/501.1, 715/513, 524, 526, 514, 517, 530, 803, 511, 715/234, 255, 272, 209, 239, 229, 273–277; 705/26; 719/315
See application file for complete search history.

(56) References Cited

U.S. PATENT DOCUMENTS

| | | | | |
|---|---|---|---|---|
| 5,021,995 | A * | 6/1991 | Quint et al. | 707/101 |
| 5,142,619 | A * | 8/1992 | Webster, III | 715/803 |
| 5,438,661 | A * | 8/1995 | Ogawa | 715/804 |
| 5,708,825 | A * | 1/1998 | Sotomayor | 715/205 |
| 5,717,945 | A * | 2/1998 | Tamura | 715/530 |
| 5,860,071 | A * | 1/1999 | Ball et al. | 707/100 |
| 5,890,171 | A * | 3/1999 | Blumer et al. | 715/501.1 |
| 5,911,145 | A * | 6/1999 | Arora et al. | 715/514 |

(Continued)

OTHER PUBLICATIONS

Laura Rintjema, Creating an HTML help system for web-based products, 1998, ACM Press, pp. 227-233.*

(Continued)

*Primary Examiner*—Adam L Basehoar
(74) *Attorney, Agent, or Firm*—Cooley Godward Kronish LLP (57) ABSTRACT

The invention is a computer-based method for analyzing two versions of an HTML document that identifies new or changed areas of the document while preserving the original textual formatting, including embedded graphics. An HTML document is scanned and the information organized into groupings of HTML tags and text. A set of rules determines which HTML tags are permitted within a group, and which mark the start of a new group. Tags that mark the start of a new group are usually those that break the flow of text when an HTML page is rendered. As a result, the text that constitutes a paragraph, embedded hypertext links, and any associated HTML character-formatting elements are contained within a single group. A modified version of the same HTML document is similarly processed. At this point, the two can be compared group by group in order to detect differences. Any group that does not match the associated group in the original is considered to be a modified group. The modified groups can then be inserted as sections into a new HTML document, and these sections appear to have nearly all of the original formatting intact. Thus, they appear as clipped sections from the original HTML document, and are useful for depicting regions of interest.

10 Claims, 7 Drawing Sheets

U.S. PATENT DOCUMENTS

| | | | |
|---|---|---|---|
| 5,913,208 A * | 6/1999 | Brown et al. | 707/3 |
| 5,956,726 A * | 9/1999 | Aoyama et al. | 707/102 |
| 5,978,819 A * | 11/1999 | Berstis | 715/205 |
| 6,070,149 A * | 5/2000 | Tavor et al. | 705/26 |
| 6,098,071 A * | 8/2000 | Aoyama et al. | 707/102 |
| 6,249,795 B1 * | 6/2001 | Douglis | 715/210 |
| 6,298,358 B1 * | 10/2001 | Gormish | 715/517 |
| 6,327,628 B1 * | 12/2001 | Anuff et al. | 719/311 |
| 6,366,933 B1 * | 4/2002 | Ball et al. | 715/203 |
| 6,502,112 B1 * | 12/2002 | Baisley | 715/513 |
| 6,507,848 B1 * | 1/2003 | Crosby et al. | 707/102 |
| 6,547,829 B1 * | 4/2003 | Meyerzon et al. | 715/234 |
| 6,560,620 B1 * | 5/2003 | Ching | 715/511 |
| 6,651,108 B2 * | 11/2003 | Popp et al. | 719/315 |
| 6,658,626 B1 * | 12/2003 | Aiken | 715/526 |
| 6,931,590 B2 * | 8/2005 | Kanie et al. | 715/234 |
| 7,137,065 B1 * | 11/2006 | Huang et al. | 715/205 |

OTHER PUBLICATIONS

"Block-level and Inline elements," HTML 4.01 Specification, W3C Recommendation Dec. 24, 1999.

\* cited by examiner

```
Source of the ///J1/Intelliseek/modifications/TEMP/patent/left.html - Netscape <td valignandf80intelligentwidthww"52hf">

<!--TEXT--> <!-- $MediaXdiXaela "Main"-Text_Body" -->
<table sinke - Bf15=Bekfor-<<05 cellspaving=F85 cellpadding-0X178>
    <tx>
        <td width=15>stdhp:</tx>
        <tx-valtgm=z#xww><pm89,808-->5&pialX Balvet 1=a> same-maxin#><taipx-#0060995093-AXTbeginIntelliseek-Xfaax<
    </tx>t_xt
    <tx>
        <t,dtx width ($5> 57oxp)</tx0>
        t,d "xalign-sop">-cxant-fabe=fabe=#kriai, Verdana x -Kexvoctce beaps-berit" wix==#1"oalox="335335">
        <x>Intelliseek;m:minsion-is to mdd-intelligence to character1/The Compare pls a leading prog
        <p><1>Software infrastructure services addIntelligence to portals_</1>Intelligent portals and
        <g> Intelliseek-services include integrated search services (nevn, database searching shopping
        services: (page 4 site tracking, topic tracking and customized tracking)
        </Tant>c/td>
    </tx>
    <tx>
        <tk>Xnosy ></td>
        <tx>xpiak
    </tx>
</table>
```

FIG. 6

```
Source of the ///J1/Intelliseek/modifications/TEMP/patent/normalized-left.html - Netscape
<table width="15" hordax"18" cellsy#aisy=F0" cellpadding="15">
<tx>
<td width="15">
</td>
<td valign="tap">
<font face+Arial, Helvetica, sans-serif"><b>The Intelliseek Mission</b></font>
</td>
</tx>
<tx>
<td width="15">
</td>
<td valign="tdp$>x
<font face=Arial="Verdana Helvetica sans-serif" six=Six>
<p>
Intelliseek's mission is to add intelligence to the internet. The Company is a leading provider of intelligent search, tracking
<p>
</1>Software infrastructure add intelligence to portals. </1>Intelligent portals understand their target audience and
<p>
Intelliseek services include: integrated search services (news, database searching, shopping, metasearching, and vertical search
</td>
</tx>
<tr>
<td>
</td>
<td>
</tx>
</table>
```

SYSTEM AND METHOD OF ANALYZING AN HTML DOCUMENT FOR CHANGES SUCH THAT THE CHANGED AREAS CAN BE DISPLAYED WITH THE ORIGINAL FORMATTING INTACT

RELATED APPLICATIONS

This application claims the benefit of U.S. Provisional Application No. 60/154,966 filed 20 Sep. 1999.

BACKGROUND OF THE INVENTION

This invention relates generally to a system and method for comparing the differences between two documents and in particular to a system and method for comparing two hypertext markup language (HTML) documents and displaying the changed areas in the HTML documents while retaining the original HTML formatting.

The traditional method of locating document changes within pure text files is accomplished via a technique known as file differencing, or diffing. UNIX has a utility called "diff" that is used for file differencing. It works by comparing each line in a first file (the Right File) with each line in a second file (the Left File). A carriage return character typically separates each line from each other line. After the comparisons are finished, each line in the Right File will be identified as having one of the following states:

1. unmodified—The current line exactly matches another line in the Left File;
2. new—The current line has no match in the Left File; and
3. modified—The current line nearly matches one of the lines in the Left File with some changes.

The unit of comparison, a line, is deliberately chosen because it is an intermediate amount of information. In other words, it is somewhat larger than a single character or word, and therefore offers a meaningful context for the detected change. However, a line is still small enough so that the remainder of text, divided into lines, is considered separately and most lines are often identical in both files.

To better understand this typical differencing technique, consider a "diff" operation, i.e., line-by-line comparison, of the text on the left and its revised version on the right where modified lines have been underlined in the right file for emphasis:

| | |
|---|---|
| La Nina continues in the Pacific Ocean, meaning cooler than average sea surface temperatures along the equator north of South America. Typically this means a warmer and drier summer for the Midwest. The Summer of '99 has been very hot, with 32 days recording highs of 90 degrees or above, and very dry, with rainfall deficits exceeding 4.5 feet so far. | La Nina continues in the Pacific Ocean, meaning cooler than average sea surface temperatures along the equator west of South America. Typically this means a warmer and drier summer for the Midwest. The Summer of 1999 has been very hot, with 32 days recording highs of 90 degrees or above, and very dry, with rainfall deficits exceeding 4.5 inches so far. |

For this example, Table 1 below illustrates what you would see if the basis of comparison was a word (left column) vs. a line (right column).

TABLE 1

Changes Found After Comparing Text on a Word Basis vs. Line Basis

| Word Basis | Line Basis |
|---|---|
| west | Equator west of South America |
| 1999 | Summer of 1999 has been very hot |
| inches | Rainfall deficits exceeding 4.5 inches |

As illustrated by the above example, the detected changes in a line by line based comparison (right column) are more useful for conveying the essence of the revisions than the detected changes when using a smaller unit comparison, such as a word based comparison.

The World Wide Web (Web) is an international network of computers containing a vast amount of information. The hypertext markup language (HTML) is the lingua franca for publishing documents on the Web. The problem is that the typical differencing operations as described above do not work well for HTML documents. In particular, unlike pure text documents, or documents created using a word processor, carriage returns in HTML documents are not significant. In more detail, the width of lines displayed by a viewer will be determined by the width of the viewer window, not where carriage returns are entered in the HTML file. Therefore, a typical differencing operation that uses lines for a unit of comparison does not work successfully when comparing HTML files since the operation may unnecessarily identify differences which are insignificant. In addition, the HTML language treats contiguous sequences of white space characters as being equivalent to a single space character. Therefore, a contiguous sequence of white space characters is equivalent to a single white space character in the HTML language, but a typical differencing operation will not take this into account.

Due to the peculiar rules of the HTML language described above, the following are equivalent representations of the same paragraph in HTML document sources:

Example 1a

HTML Paragraph

<P> La Nina continues in the Pacific Ocean, meaning cooler than average sea surface temperatures along the equator west of South America. Typically this means a warmer and drier summer for the Midwest.
<\P>

Example 1b

Equivalent Variation of HTML Paragraph

<P> La Nina continues in the Pacific Ocean, meaning cooler than average sea surface temperatures along the equator west of South America. Typically this means a warmer and drier summer for the Midwest.
</P>

If a typical differencing operation is carried out on the two above paragraphs (which are considered to be identical in the HTML language), the differencing operation would find multiple differences since each line is compared character by character. It is thus apparent that applying a typical differencing operation to these HTML formatted paragraphs would be ineffective, as it would identify every line as changed instead of recognizing these representations as equivalent. Thus, it is desirable to provide a system and method for analyzing an HTML document for changes and for displaying the changed areas with the original HTML formatting intact and it is to this end that the present invention is directed.

SUMMARY OF THE INVENTION

The World Wide Web (Web) is an international network of computers containing a vast amount of information. HTML is the lingua franca for publishing documents on the Web. This invention describes a computer-based method for analyzing two versions of an HTML document, which identifies new or changed areas of the document while preserving the original textual formatting.

Using the system and method in accordance with the invention, two versions of an HTML document are to be analyzed. The original version will be referred to as the Left File, while the updated version will be referred to as the Right File. Possible modifications of the Left File to produce the Right File might include the deletion of text, hypertext links, or embedded images; the modification of text, hypertext links, or embedded images; the insertion of text, hypertext links, or embedded images; or any combination thereof. These document elements are usually the most interesting elements for users to monitor for changes, but any document element can be monitored for changes with this method, while preserving visual formatting in the vicinity of the change or changes. Examples of visual formatting include font type, font size, and use of bold or italics.

In more detail, an HTML document may be scanned and the information organized into groupings of HTML tags and text. The system includes a set of rules for determining which HTML tags are permitted within a group, and which HTML tags mark the start of a new group. The tags that mark the start of a new group are usually those that break the flow of text when an HTML page is rendered. As a result, the text that constitutes a paragraph, embedded hypertext links, and any associated HTML character-formatting elements are contained within a single group. A modified version of the same HTML document is similarly processed. Once the processing is complete, the two HTML documents may be compared group by group in order to detect differences. Any group that does not match the associated group in the original is considered to be a modified group. The modified groups can then be inserted as sections into a new HTML document, and these sections appear to have nearly all of the original formatting intact. Thus, the modified sections may appear as clipped sections from the original HTML document and are useful for depicting regions of interest. In addition to providing a new document with the clipped sections, a HTML page with the changed highlighted for the user may be displayed to the user.

DETAILED DESCRIPTION OF A PREFERRED EMBODIMENT

The invention is particularly applicable to a personal computer based system and method for normalizing and comparing HTML documents and it is in this context that the invention will be described. It will be appreciated, however, that the system and method in accordance with the invention has greater utility, such that it may be implemented using other types of computer systems, such as a client/server type system or any other computer-based system and may be used with other formatted files.

Figure 1:
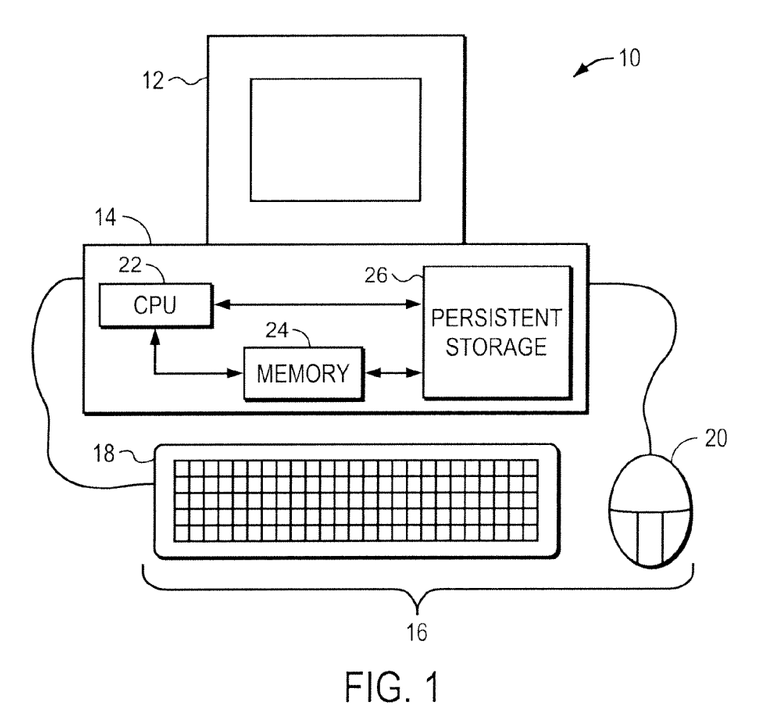
FIG. 1 is a diagram illustrating an example of a computer-based system that may be used to execute the HTML normalization method in accordance with the invention.

FIG. 1 is a diagram illustrating an example of a computer-based system 10 that may be used to execute the HTML normalization method in accordance with the invention. In this example, a typical personal computer is shown although the system and method in accordance with the invention may also be implemented on other different types of computer systems, such as client/server systems, local area networks and the like. The computer 10 may include a display unit 12, a main processing unit 14 and one or more input/output devices 16. In this example, the one or more input/output devices may include a keyboard 18 and a mouse 20. In accordance with the invention, the input/output devices may also include, for example, a printer. The display unit 12 may be any typical display device, such as a cathode ray tube, a liquid crystal display or the like.

The main processing unit 14 may further include a central processing unit (CPU) 22, a memory 24 and a persistent storage device 26 that are interconnected together. The CPU 22 may control the operation of the computer and may execute one or more software applications, such as the HTML normalizer and comparer in accordance with the invention. The software applications may be stored permanently in the persistent storage device 26 that stores the software applications even when the power is off and then loaded into the memory 24 when the CPU is going to execute the particular software application. The persistent storage device 26 may be a hard disk drive, an optical drive, a tape drive or the like. The memory may be a random access memory (RAM), a read only memory (ROM) or the like. In operation, a normalization and comparing software application may be stored in the persistent storage device and, based on user input, loaded into the memory to be executed by the CPU. The normalizer and comparer system in accordance with the invention may normalize the HTML documents, as described below, into one or more blocks of information and then compare the blocks of information to each other in order to accurately compare the HTML documents and maintain the formatting of the HTML documents during the comparison. Now, more details of the normalization and comparison system in accordance with the invention will be described.

Figure 2:
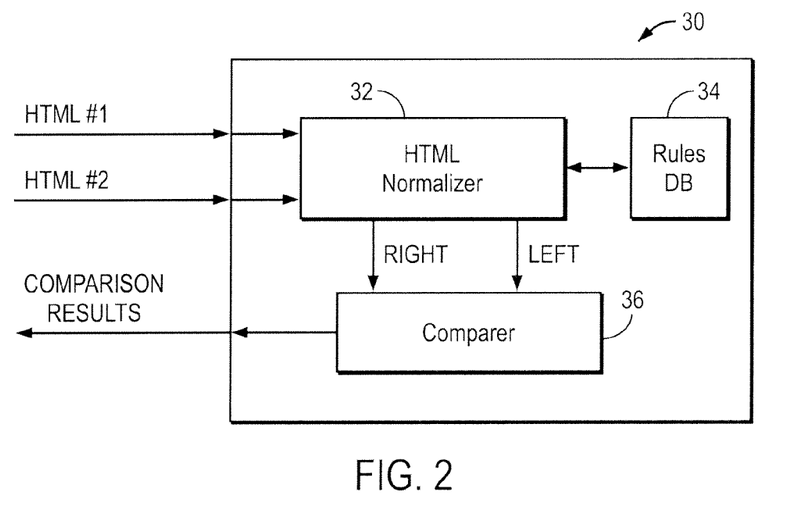
FIG. 2 is a diagram illustrating a computer-implemented HTML normalization and comparison system in accordance with the invention.

FIG. 2 is a diagram illustrating a computer-implemented HTML normalization and comparison system 30 in accordance with the invention. Although a software application implemented system and method in accordance with the invention is described herein, the system and method may also be implemented in hardware. The system 30 may include one or more software application modules that may be executed by the CPU (See FIG. 1) in order to perform the functions of the system in accordance with the invention. The system 30 may include an HTML normalizer module 32, a rules database 34 and a comparer 36. The normalizer module 32 may convert a first HTML document (HTML #1) and a second HTML document (HTML #2) into a normalized first and second document (RIGHT and LEFT) based on one or more normalization rules that may be stored in the rules database 34. The normalization of the two HTML documents permits those documents to be compared by a typical line comparison module 36 and then to display the results of the comparison while maintaining the formatting on the HTML documents. In general, the normalization may involve the conversion of the HTML document into one or more blocks of information wherein each block of information may be treated as a single line for purposes of the comparison. Thus, the normalization permits a typical line based comparison module to be used to accurately compare two HTML documents. More details of the normalization and the normalization rules in the rules database will now be described.

Figure 3:
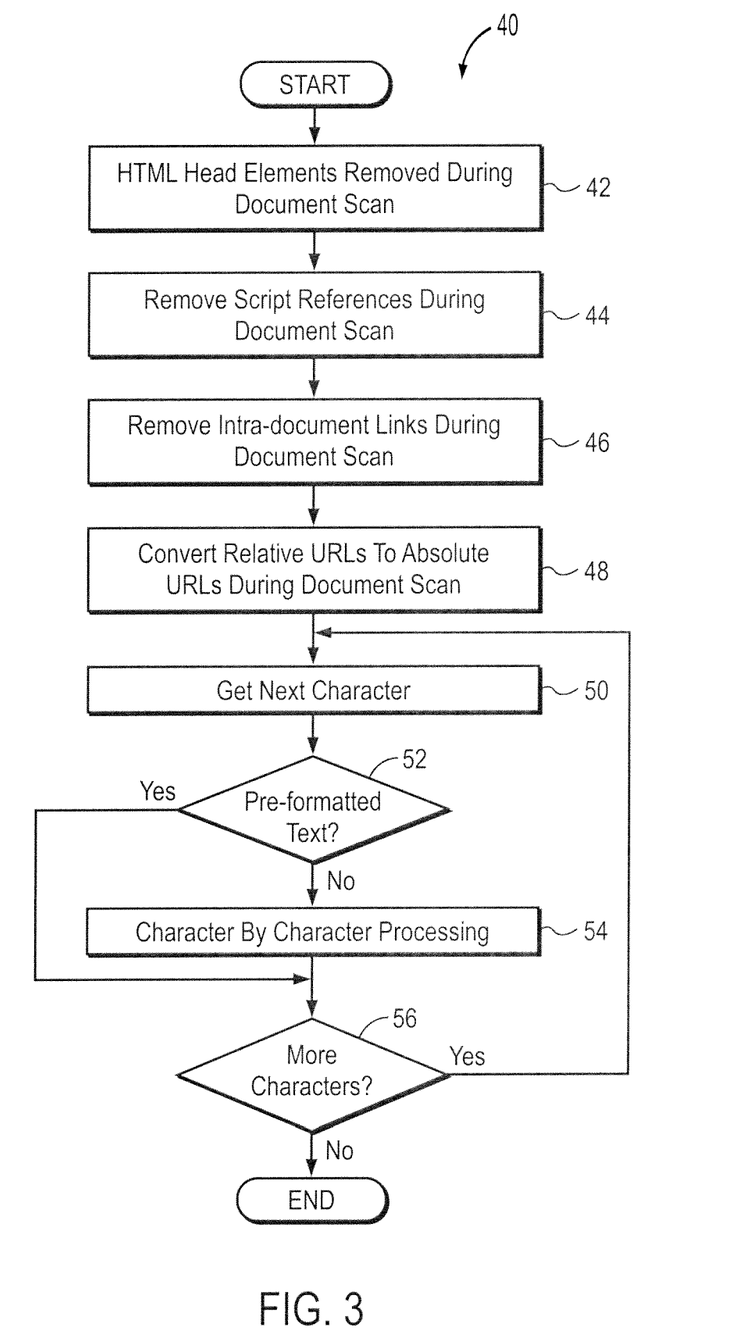
FIG. 3 is a flowchart illustrating a method for HTML normalization in accordance with the invention.

FIG. 3 is a flowchart illustrating a method 40 for HTML document normalization in accordance with the invention so that two HTML documents may be compared to each other using typical comparison systems while maintaining the formatting of the HTML documents. In step 42, the entire HTML document is scanned and any HTML head element are removed from the document. In step 44, the HTML document is scanned again and any references to scripts in the HTML document are removed. In step 46, the HTML document is scanned again and any intradocument links are removed. In step 48, the HTML document is scanned again and any relative URLs in the HTML document are converted into absolute URLs. These rules in steps 42-48 provide special handling of HTML elements which are not valid when removed from the context of the original page.

Now, the entire HTML document is scanned again on a character by character basis to complete the normalization process. In particular, in step 50, the next character in the document is retrieved. Next, in step 52, the method determines if a preformatted text character sequence (/PRE) has been located by scanning several characters. If the preformatted text tag has not been located, then character by character processing in step 54 occurs. The character by character processing will be described below in more detail. If a preformatted text tag has been located, then the method skips step 54 so that none of the character by character processing is carried out on the preformatted text. With the test in step 52, once an end tag for the preformatted text is located, the character by character processing may be resumed. Next, in step 56, the method determines if there are more characters to analyze and loops back to step 50 to get the next character or the normalization process is completed.

The character by character processing may occur by applying multiple different rules to each character. The rules may include removing the carriage returns from the HTML document, converting multiple white spaces in the document into single white spaces, separating any block level HTML elements from each other onto separate lines by inserting a carriage return before the start tag so that each block in the HTML document is treated as a separate line for comparison purposes, and keeping any text level HTML elements on the same line. It should be noted that text level HTML elements don't cause paragraph breaks when rendered into a displayable form in a web browser. Those text level elements that define character styles can generally be nested as long as they contain other text level elements but not block level elements since block level elements are placed on separate lines. In accordance with the invention, the text level elements may include, for example, font style elements, phrase elements, form fields, A (anchor) elements, IMG elements (e.g., an inline image in an HTML document), APPLET elements (e.g., Java Applets), FONT elements, BASEFONT elements, BR elements (e.g., line breaks in the HTML document), and MAP elements (e.g., a client-side image map in the HTML document). In removing the white spaces, the method may encounter a first white space and store it and then throw away all subsequent white spaces until another character is encountered so that the multiple contiguous white space characters are converted into a single white space character.

The normalization process has now been completed so that the two normalized HTML documents may be compared by a typical line comparison operation while still maintaining the formatting of the HTML document. In summary, the invention establishes a method for generating a normalized form for an HTML document so that equivalent representations, once normalized, will appear identical when analyzed via typical line differencing. Another result is that normalization, when applied as described, will organize block elements, which do not nest additional block elements, each on separate lines. This is important because it keeps hypertext links and presentation elements, those that produce visual effects, together with textual content. Thus, when line differencing is applied, the detected changes are at the block level. In addition. these block elements will be properly formed HTML, with textual formatting automatically included along with any associated text.

As described above, there are additional rules that make reference to other areas within the HTML document, such as removing intradocument links and script references and converting relative URLs. These rules are not strictly necessary to facilitate the comparison process, but do avoid errors in the rendering stage when the changed blocks of HTML, inserted into the body of a new HTML document, are rendered in the browser. The head element is also removed since this area of the HTML source does not contain displayable information, and so it isn't usually useful to report changes occurring here.

Now, an example of two HTML documents being normalized in accordance with the invention will be described. Referring back to Examples 1a and 1b above, if the rules of normalization in accordance with the invention are applied to Examples 1a and 1b, the two representations would appear identical. In particular, for this example, all characters would be organized on a single line, including the <P> and </P> tags.

In accordance with the invention, the changed areas that are discovered through the differencing process appear as clipped regions from the original revised HTML document (Right File) when rendered in the browser. Instead of the clipped regions, a new HTML page with the all of the original content plus the changes highlighted may also be displayed for the user. Now, an example of the system and method in accordance with the invention will be described.

Figure 4:
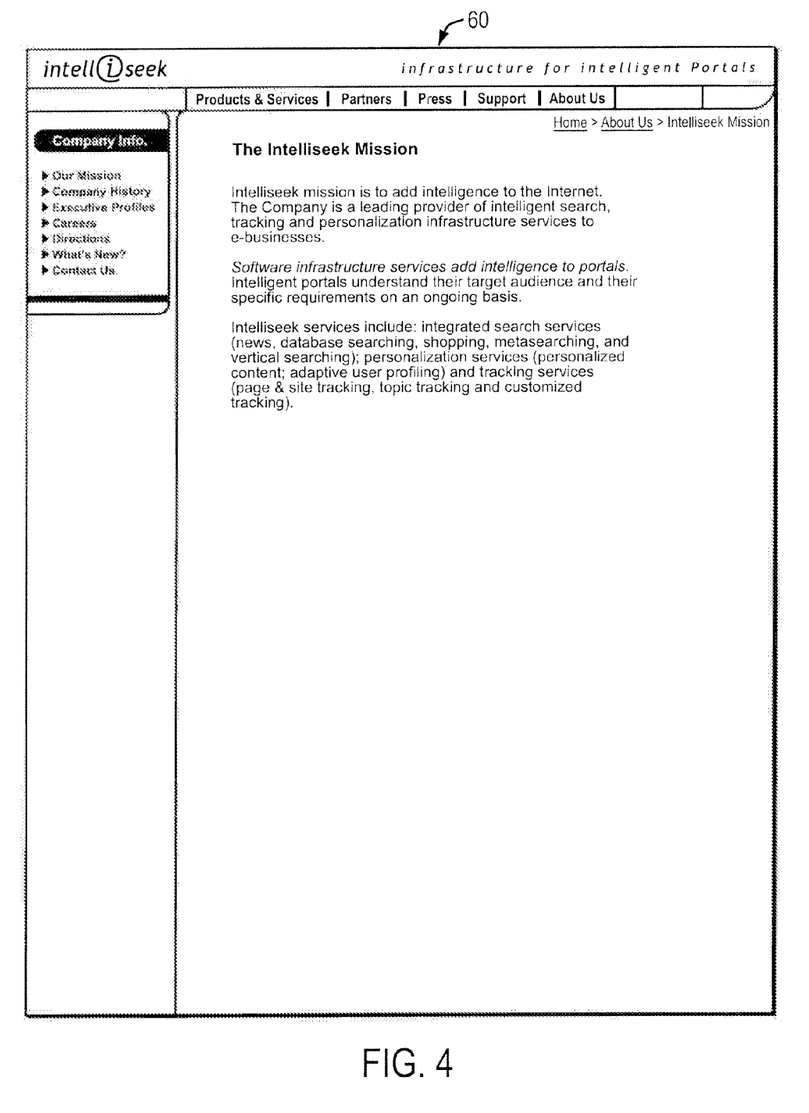
FIG. 4 illustrates an example of a left file in accordance with the invention.
Figure 5:
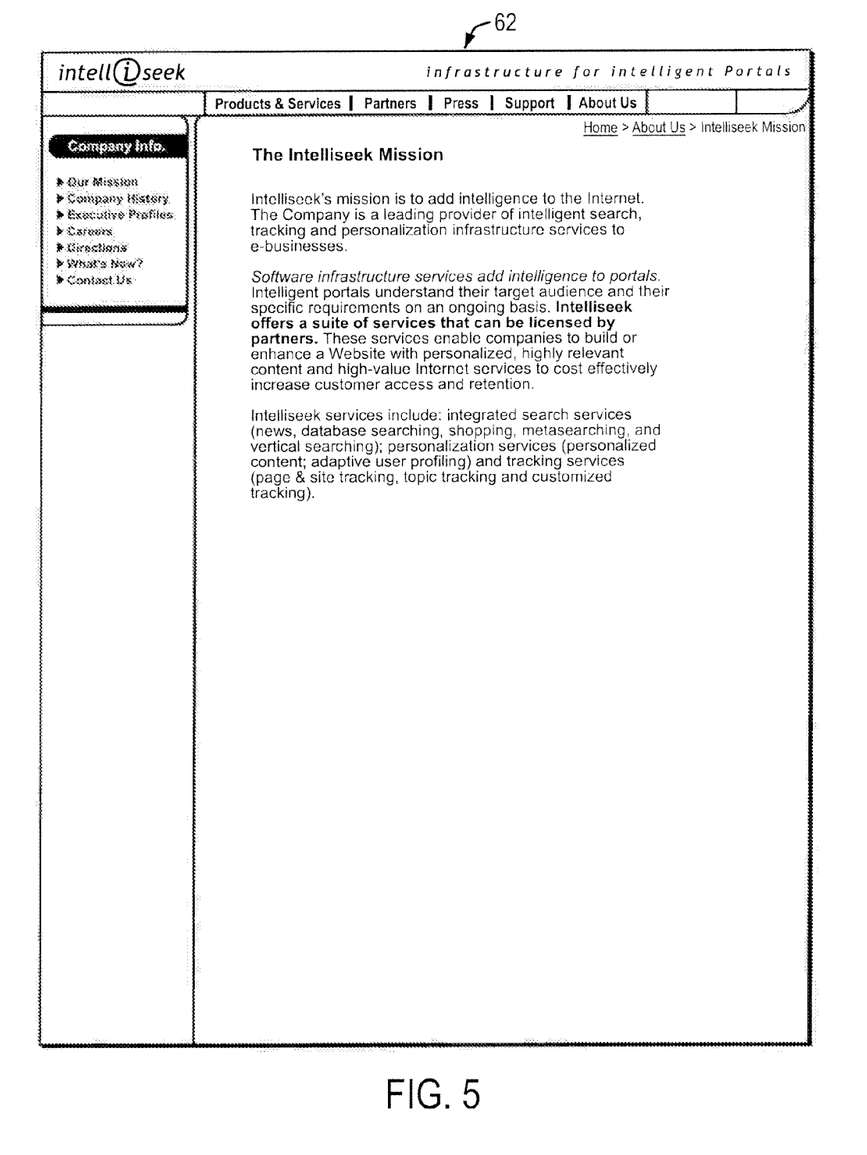
FIG. 5 illustrates an example of a right file in accordance with the invention.

FIG. 4 illustrates an example of a left file 60 and FIG. 5 illustrates an example of a right file 62 wherein the two files are HTML pages that display information to the user. For purposes of a simple example, there is additional text in the second paragraph of the right file shown in FIG. 5, beginning with the sentence formatted in bold. The second paragraph is the changed information that will be automatically identified by the system and method, along with its embedded formatting, in accordance with the invention. The system and method can obviously also be used to compare more complex HTML files.

Figure 6:
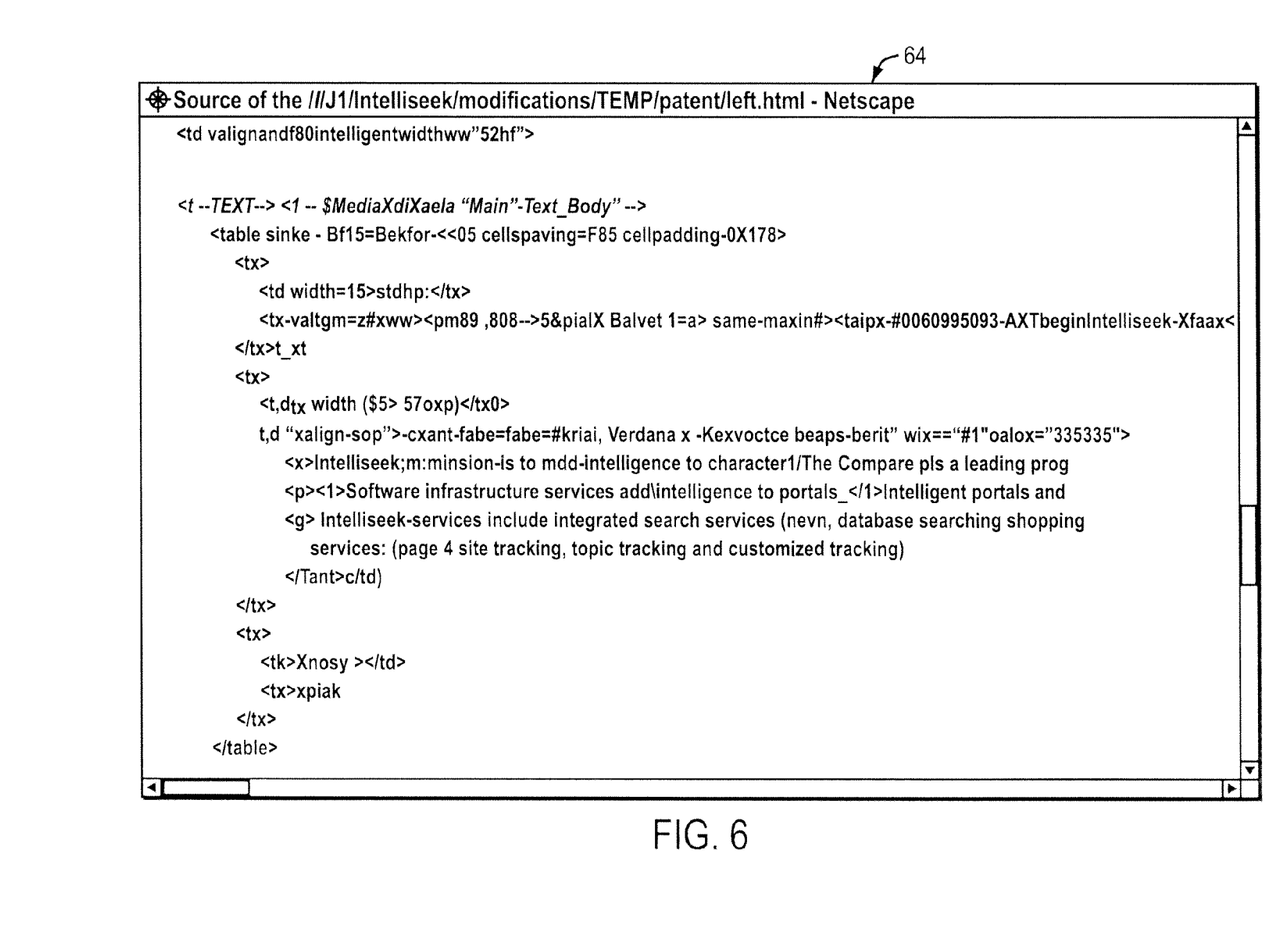
FIG. 6 illustrates an example of a typical HTML file.
Figure 7:
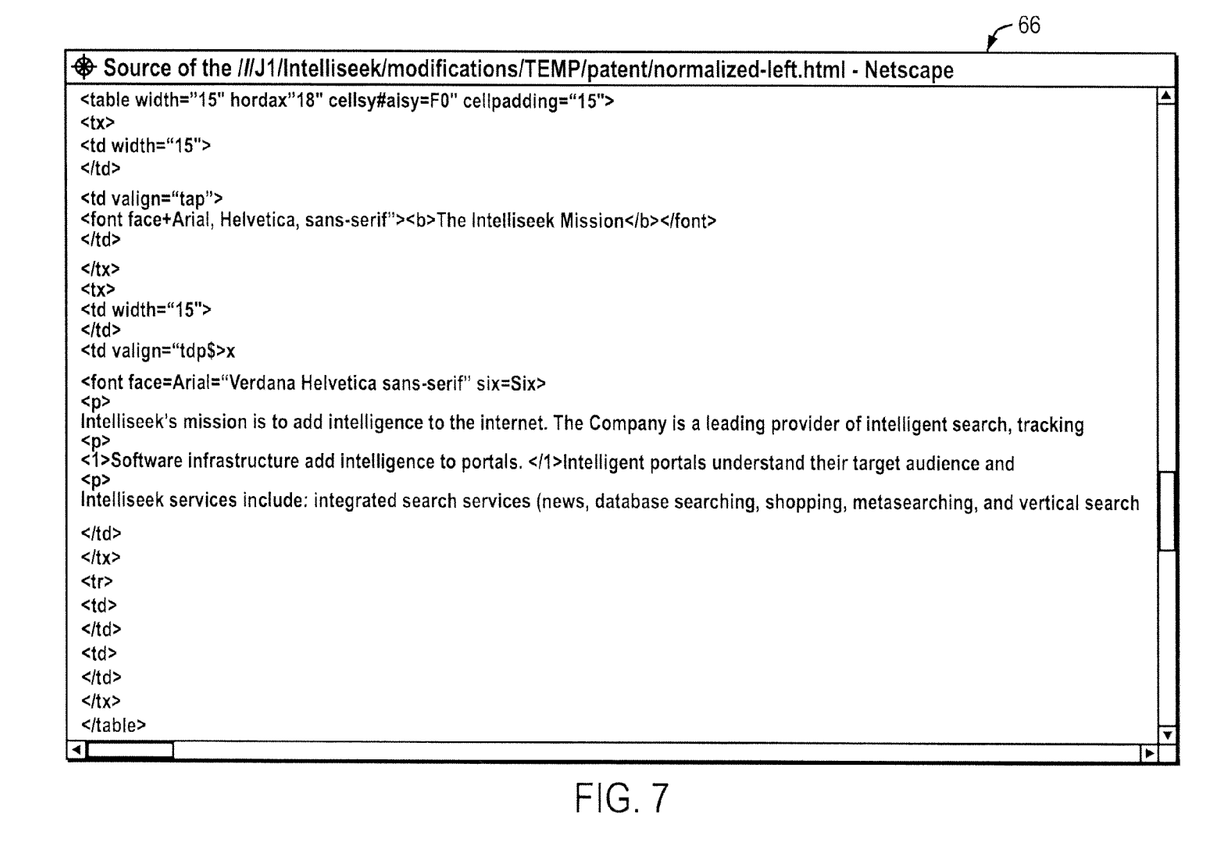
FIG. 7 illustrates the HTML file of FIG. 6 after normalization in accordance with the invention.

FIG. 6 illustrates an example of a typical HTML file 64 that represents the left file shown in FIG. 4 while FIG. 7 illustrates a normalized HTML file 66 that corresponds to the HTML file shown in FIG. 6. As described above, various elements of the HTML file are removed, not to facilitate the comparison process, but to avoid errors in the rendering stage when the changed blocks of HTML are inserted into the body of a new HTML document for display in the browser. As also explained, each paragraph shown in FIGS. 4 and 5 is inside a block-level HTML element that is deliberately arranged on a single line. Thus, although various elements of the HTML page are removed, portions of the HTML are arranged on a single line so that the line-by-line comparison method may be used to find differences in the HTML documents.

Figure 8:
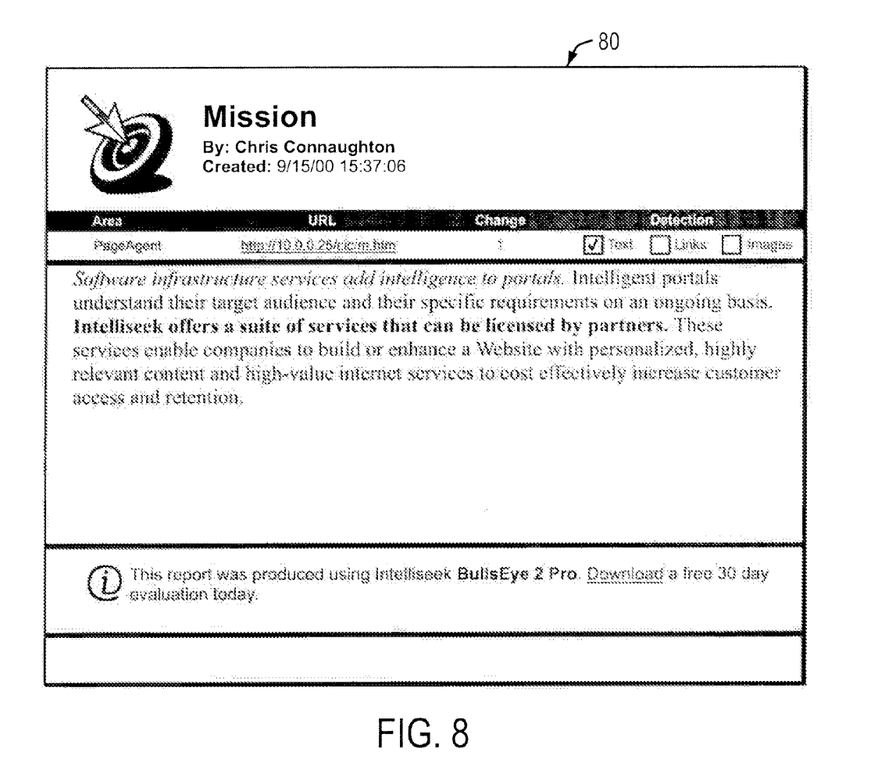
FIG. 8 illustrates an example of the comparison results file being displayed to the user.

FIG. 8 illustrates an example of the comparison results file 80 being displayed to the user. As shown, the file may be a HTML page that is displayed to the user. As shown, the formatting of the changed portion (part of which has a bold appearance) and the surrounding portions is maintained so that the user can see the new or changed information as it was originally intended to appear.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A computer readable storage medium comprising executable instructions to:
   receive a first document and a second document coded in a markup language;
   parse the first and second documents to identify block elements in each document;
   apply a rules-based, multi-scan markup code reduction normalizer to the first and the second documents to create a normalized first document and a normalized second document maintaining the visual formatting of the first and second documents and having separate lines corresponding to the block elements in each document, the normalized first and second documents coded in the markup language;
   wherein the markup code reduction normalizer scans for and removes any markup code head element, reference to scripts, intradocument link, and relative URL, and then performs character-by-character processing except for identified pre-formatted text;
   perform a line-by-line comparison between the normalized first and second documents to find differences; and
   generate a comparison document coded in the markup language and preserving the visual formatting of one of the first and second documents to record the differences.

2. The computer readable storage medium of claim 1, wherein the executable instructions to parse the first and second documents comprise executable instructions to detect and distinguish tags in the documents.

3. The computer readable storage medium of claim 2, wherein the markup language comprises HTML and the tags comprise HTML tags.

4. The computer readable storage medium of claim 3, wherein the block elements comprise text, embedded hypertext links and HTML character-formatting elements.

5. The computer readable storage medium of claim 4, wherein the block elements are delimited by HTML tags and carriage returns.

6. The computer readable storage medium of claim 4, wherein the executable instructions to apply a rules-based, multi-scan markup code reduction normalizer to the first and second documents comprise executable instructions to process the first and second documents character-by-character according to a set of rules.

7. The computer readable storage medium of claim 6, wherein the rules preserve the visual formatting of the first and second documents.

8. The computer readable storage medium of claim 7, wherein the executable instructions to apply a rules-based, multi-scan markup code reduction normalizer to the first and second documents generate identical normalized first and second documents for visually equivalent first and second documents.

9. The computer readable storage medium of claim 1, wherein the executable instructions to perform a line comparison comprise executable instructions to apply a line-by-line comparison to the normalized first and second documents.

10. The computer readable storage medium of claim 1, wherein the comparison document comprises all of the original content from the first document that remained unchanged in the second document.

* * * * *

UNITED STATES PATENT AND TRADEMARK OFFICE
CERTIFICATE OF CORRECTION

PATENT NO.        : 7,661,062 B1                              Page 1 of 1
APPLICATION NO. : 09/665888
DATED             : February 9, 2010
INVENTOR(S)       : Chris Connaughton It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1054 days.

Signed and Sealed this

Thirtieth Day of November, 2010

David J. Kappos
*Director of the United States Patent and Trademark Office*